United States Patent
Radigan

(10) Patent No.: US 12,370,613 B2
(45) Date of Patent: Jul. 29, 2025

(54) SAW SUPPORT ASSEMBLY

(71) Applicant: Sean Radigan, Massapequa Park, NY (US)

(72) Inventor: Sean Radigan, Massapequa Park, NY (US)

( * ) Notice: Subject to any disclaimer, the term of this patent is extended or adjusted under 35 U.S.C. 154(b) by 0 days.

(21) Appl. No.: 18/117,990

(22) Filed: Mar. 6, 2023

(65) Prior Publication Data

US 2023/0201935 A1    Jun. 29, 2023

Related U.S. Application Data

(63) Continuation of application No. 17/676,059, filed on Feb. 18, 2022, now Pat. No. 11,597,020.

(60) Provisional application No. 63/151,963, filed on Feb. 22, 2021.

(51) Int. Cl.
*B23D 47/02* (2006.01)
*B23D 59/00* (2006.01)
*B25H 1/00* (2006.01)
*A47B 5/04* (2006.01)

(52) U.S. Cl.
CPC ......... *B23D 47/025* (2013.01); *B23D 59/007* (2013.01); *B25H 1/00* (2013.01); *A47B 5/04* (2013.01)

(58) Field of Classification Search
CPC . B23D 47/025; B23D 59/007; Y10T 83/7684; Y10T 83/7697; B25H 1/12; B25H 1/00; B25H 1/06
USPC .............. 248/284.1, 240, 653; 144/285, 287, 144/286.5; 108/3, 69, 134, 166
See application file for complete search history.

(56) References Cited

U.S. PATENT DOCUMENTS

| | | | |
|---|---|---|---|
| 199,236 A | | 1/1878 | Tatem |
| 1,017,724 A | * | 2/1912 | Allingham ............. F16M 11/12 248/240.4 |
| 1,116,091 A | | 11/1914 | McDonald |
| 2,239,225 A | * | 4/1941 | Gordon ..................... A47B 5/04 108/134 |
| 2,499,062 A | | 2/1950 | Greenberg |
| 2,577,399 A | | 12/1951 | Bell |
| 2,782,086 A | * | 2/1957 | Gaston ..................... A47B 1/04 248/240.4 |

(Continued)

OTHER PUBLICATIONS

Richeliue Catalog Library—Richeliue 2017 CCRM US; 2017.*
Richeliue BP657730; 2017; https://www.richelieu.com/US/en/category/furniture-equipment/wall-shelf-supports/specialized-shelf-support/folding-support-with-extension/1015229/sku-BP657730.*

*Primary Examiner* — Laura M Lee
(74) *Attorney, Agent, or Firm* — Shore IP Group, PLLC; Sean R. Wilsusen

(57) ABSTRACT

A saw support assembly includes a base member defining a receiving channel. The receiving channel of the base member is configured to receive a leg of a saw therein to secure the base member to the leg of the saw. An arm member is pivotably coupled to the base member. The arm member is configured to pivot towards or away from the base member. The arm member is configured to extend from the base member to support the leg of the saw to which the base member is secured. A branch member extends between the base member and the arm member. The branch member defines a first end connected with the base member and a second end connected with the support arm. The branch member is configured to limit a degree to which the arm member can pivot away from the base member.

20 Claims, 5 Drawing Sheets

(56) References Cited

U.S. PATENT DOCUMENTS

| | | | |
|---|---|---|---|
| 2,882,004 | A | 4/1959 | Leiskman |
| 3,086,657 | A | 4/1963 | Myers et al. |
| 3,563,592 | A | 2/1971 | Preston |
| 3,672,312 | A | 6/1972 | Pettit et al. |
| 4,378,107 | A | 3/1983 | Wagster et al. |
| 4,840,340 | A | 6/1989 | Gustafsson et al. |
| 4,852,623 | A | 8/1989 | Rodrigues |
| 4,874,025 | A | 10/1989 | Cleveland |
| 5,381,738 | A * | 1/1995 | Meyer ............... A47B 5/00 108/42 |
| 5,462,102 | A | 10/1995 | Searfoss |
| 5,836,365 | A | 11/1998 | Derecktor |
| 6,332,549 | B1 * | 12/2001 | MacDonald ......... A47B 47/027 211/183 |
| 6,471,461 | B2 * | 10/2002 | Muilwyk ............. B65G 11/123 193/17 |
| 7,210,414 | B1 | 5/2007 | Barone |
| 8,267,017 | B1 * | 9/2012 | Michael .............. A47B 5/04 248/240.4 |
| 9,061,359 | B2 | 6/2015 | Wiker et al. |
| 9,951,903 | B2 | 4/2018 | Barnes et al. |
| 2005/0034783 | A1 | 2/2005 | Laird |
| 2005/0217446 | A1 | 10/2005 | Brazell et al. |
| 2023/0201935 | A1 | 3/2023 | Radigan |

\* cited by examiner

SAW SUPPORT ASSEMBLY

CROSS REFERENCE TO RELATED APPLICATION

The present application is a continuation of U.S. patent application Ser. No. 17/676,059 filed on Feb. 18, 2022, which issues as U.S. Pat. No. 11,597,020 on Mar. 7, 2023, and which claims the benefit of and priority to U.S. Provisional Application No. 63/151,963, filed Feb. 22, 2021, the entire contents of which are incorporated by reference herein.

FIELD

The present disclosure relates to a support assembly, and more particularly, to a support assembly for a saw.

BACKGROUND

Generally, saws such as table saws are marketed and sold with legs of fixed height. Often, saws such as table saws are positioned on top of a first table or platform that is adjacent to a second table or platform designed to receive cut material passed through the saw. The result is that a saw such as a table saw is often poorly vertically aligned with an adjacent table. Therefore, when a cut material having passed through the saw is advanced off of the support platform of the saw the cut material will not smoothly slide onto the adjacent table or platform because of the lack of vertical alignment between the support platform of the saw and the adjacent table or platform.

SUMMARY

Provided in accordance with aspects of the present disclosure is a saw support assembly including a base member defining a receiving channel. The receiving channel of the base member is configured to receive a leg of a saw therein to secure the base member to the leg of the saw. An arm member is pivotably coupled to the base member. The arm member is configured to pivot towards or away from the base member. The arm member is configured to extend from the base member to support the leg of the saw to which the base member is secured. A branch member extends between the base member and the arm member. The branch member defines a first end connected with the base member and a second end connected with the support arm. The branch member is configured to limit a degree to which the arm member can pivot away from the base member.

In an aspect of the present disclosure, a notch is defined in the base member and an overhang is defined in the arm member. The overhang is configured to be seated in the notch when the arm member is maximally pivoted away from the base member.

In an aspect of the present disclosure, the branch member defines a first branch member pivotably coupled to the base member and a second branch member pivotably coupled to the arm member. The first branch member is pivotably coupled to the second branch member. The first and second branch members are configured to be folded towards each other as the arm member is pivoted toward the base member.

In an aspect of the present disclosure, the arm member defines an I-beam shape.

In an aspect of the present disclosure, the arm member defines a proximal end portion pivotably coupled to the base member and a distal end portion opposite the proximal end portion. The distal end portion of the arm member defines a plurality of apertures therein.

In an aspect of the present disclosure, the arm member is configured to be folded against the base member.

In an aspect of the present disclosure, the arm member is substantially parallel with the base member when the arm member is folded against the base member. The arm member forms about a ninety degree angle with the base member when the arm member is maximally pivoted away from the base member.

In an aspect of the present disclosure, an insert member is configured to be inserted in the receiving channel. The insert member defines a substantially flat surface along a surface of the insert member facing away from the base member.

In an aspect of the present disclosure, the receiving channel defines a semicircular shape. The insert member defines a semicircular shape.

In an aspect of the present disclosure, at least two apertures are defined in the base member. The at least two apertures are configured to secure the base member to the leg of the saw.

In an aspect of the present disclosure, the arm member defines a notch on a bottom surface thereof. The notch is aligned with an aperture of the at least two apertures defined in the base member when the arm member is folded against the base member.

Provided in accordance with aspects of the present disclosure is a saw support assembly kit including a set of at least four saw support assemblies.

BRIEF DESCRIPTION OF THE DRAWINGS

Various aspects and features of the present disclosure are described hereinbelow with reference to the drawings wherein.

DETAILED DESCRIPTION

Figure 1:
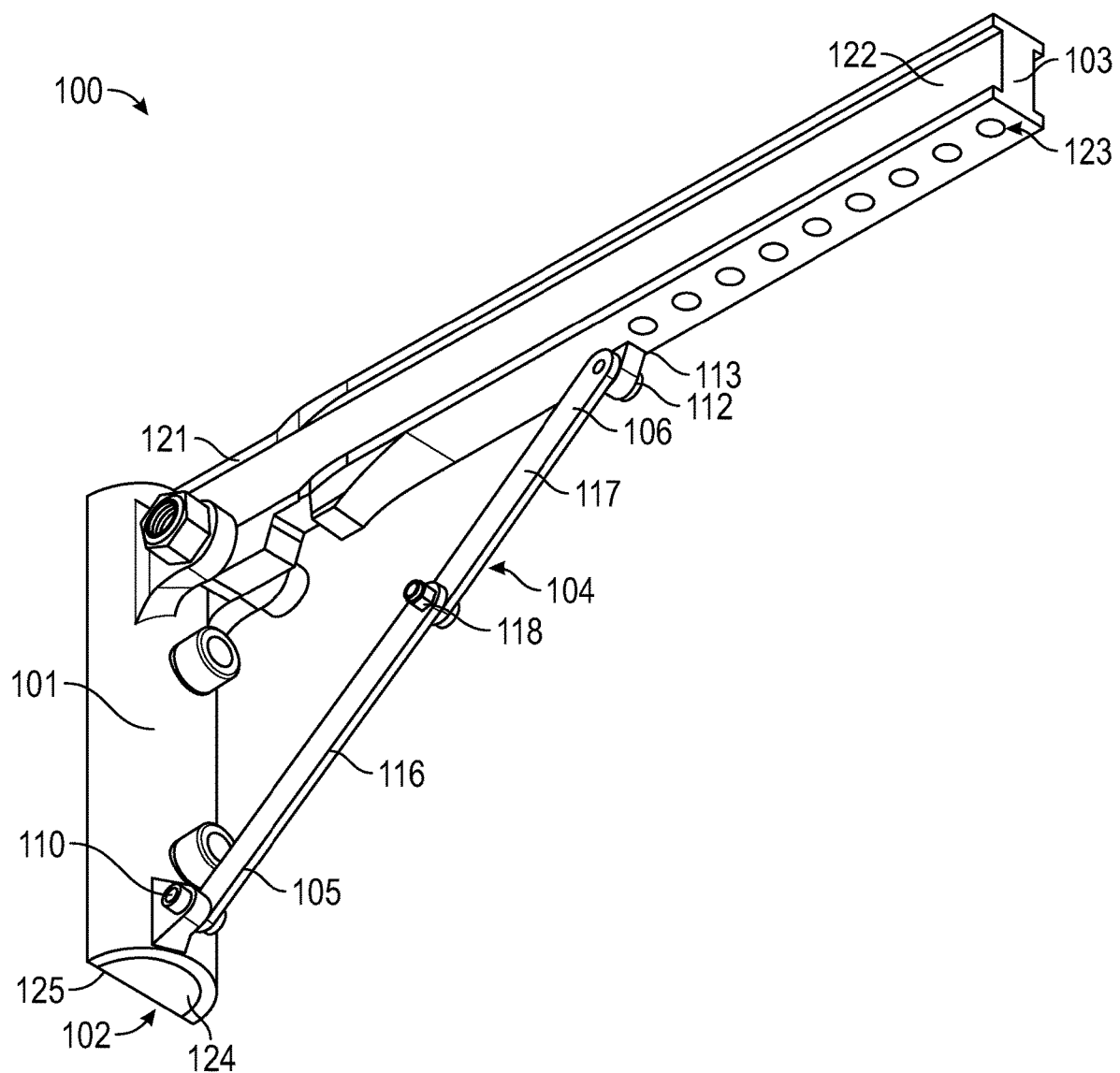
FIG. 1 is a perspective view of a saw support assembly according to aspects of the present disclosure.

The terms "about," substantially," and the like, as utilized herein, are meant to account for manufacturing, material, environmental, use, and/or measurement tolerances and variations, and in any event may encompass differences of up to 10%. Further, to the extent consistent, any of the aspects described herein may be used in conjunction with any or all of the other aspects described herein.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

As used herein, the term "distal" refers to the portion that is being described which is further from a user, while the term "proximal" refers to the portion that is being described which is closer to a user.

Exemplary configurations of the disclosure will be described more fully below (e.g., with reference to the accompanying drawings). Like reference numerals may refer to like elements throughout the specification and drawings.

Figure 2:
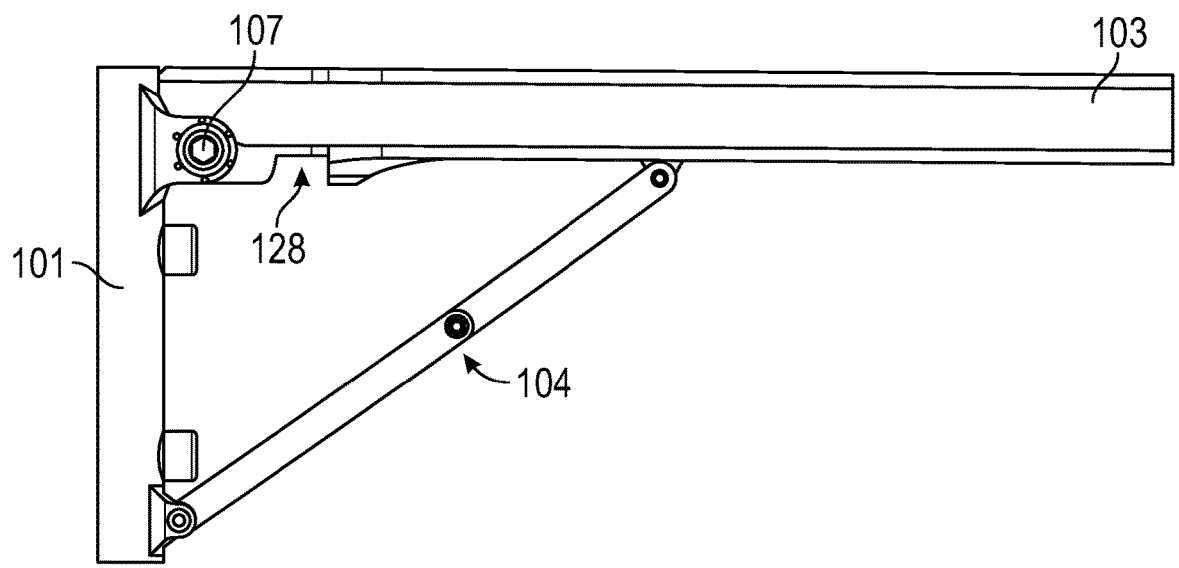
FIG. 2 is a side view of the saw support assembly of FIG. 1 in an unfolded configuration.
Figure 3:
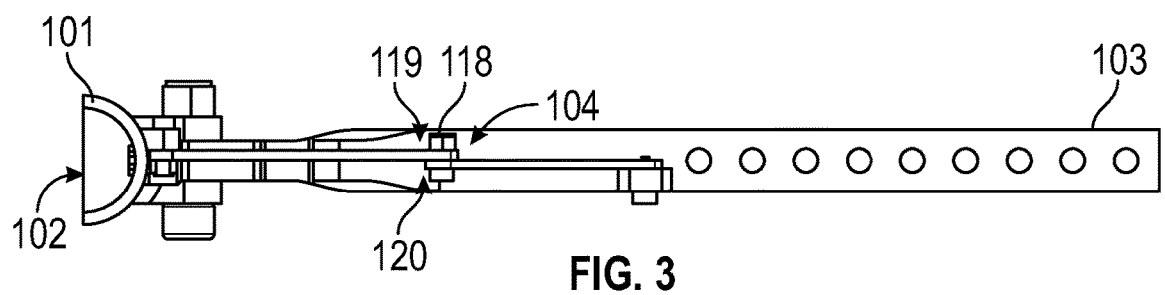
FIG. 3 is a top plan view of the saw support assembly of FIG. 1 in an unfolded configuration.
Figure 4:
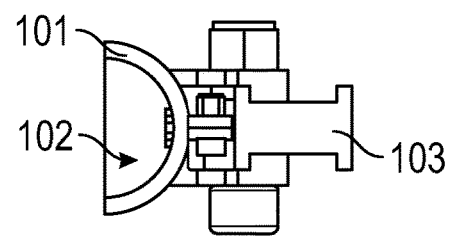
FIG. 4 is a top plan view of the saw support assembly of FIG. 1 in a folded configuration.
Figure 5:
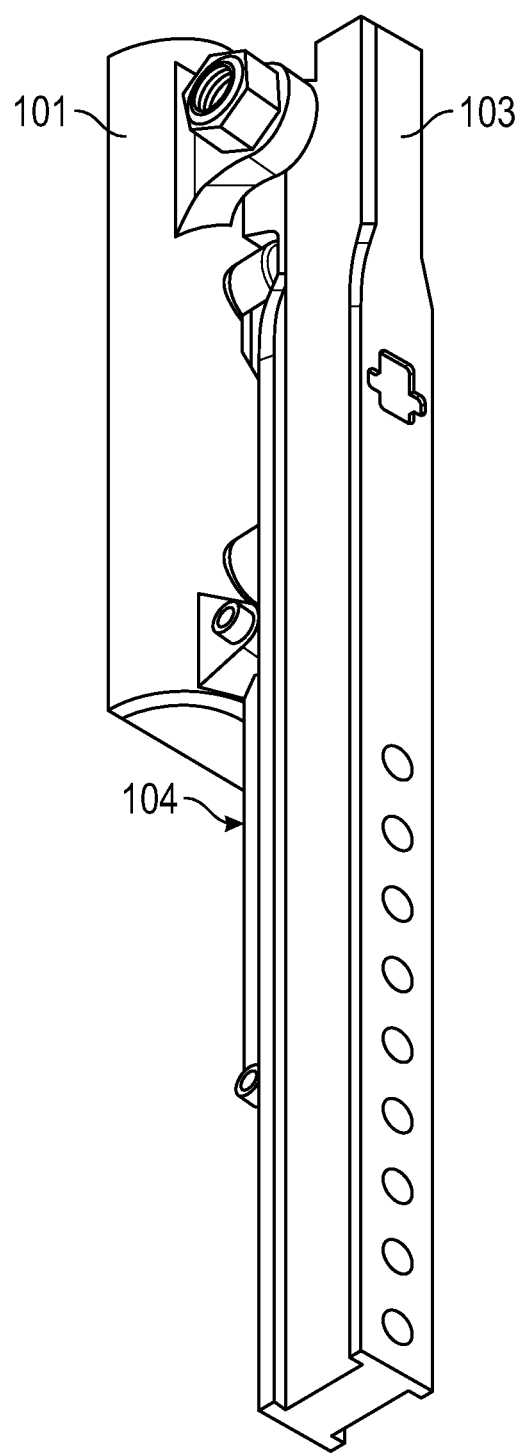
FIG. 5 is a perspective view of the saw support assembly of FIG. 1 in a folded configuration.
Figure 6:
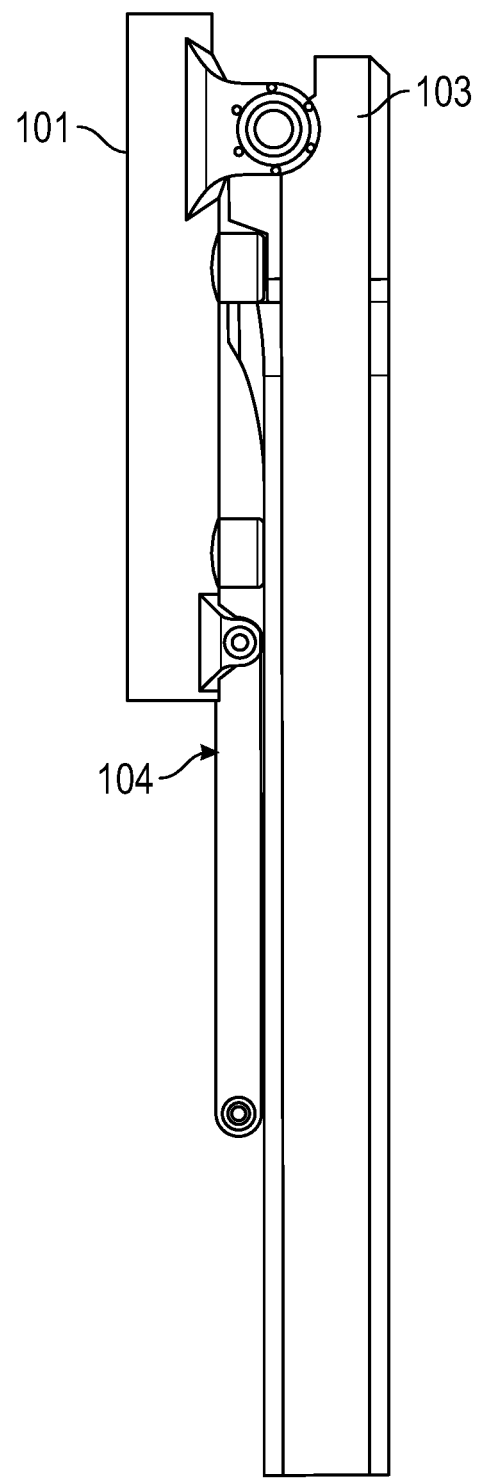
FIG. 6 is a side view of the saw support assembly of FIG. 1 in a folded configuration.
Figure 7:
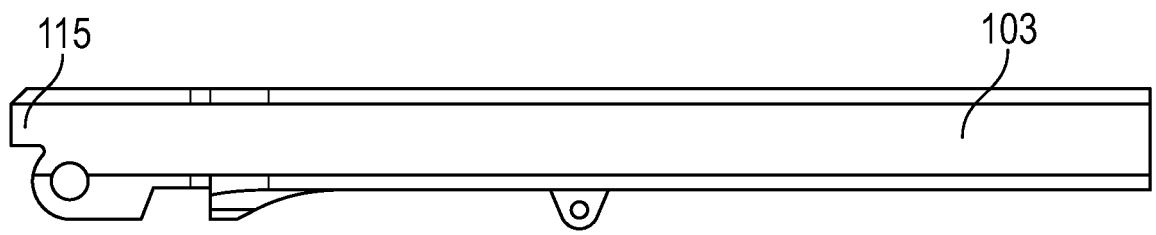
FIG. 7 is a side view of an arm member of the saw support assembly of FIG. 1.
Figure 8:
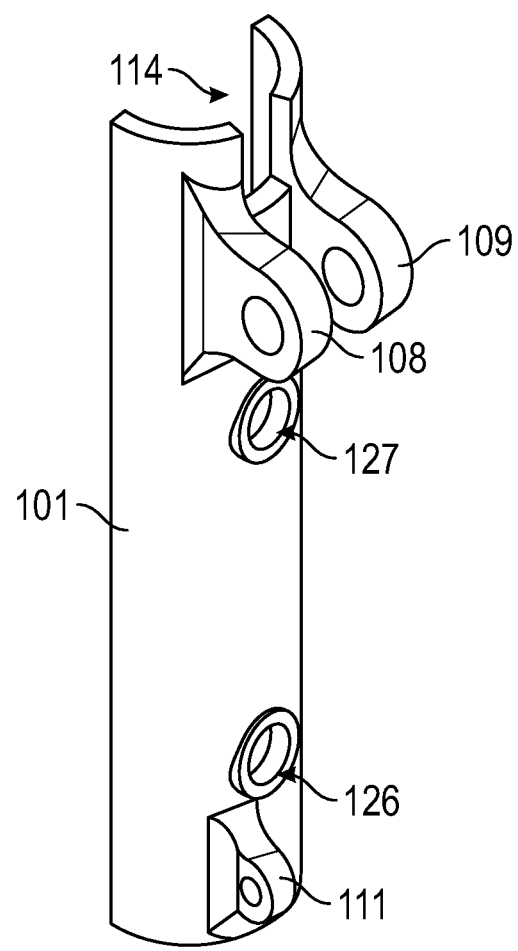
FIG. 8 is a perspective view of a base member of the saw support assembly of FIG. 1.
Figure 9:
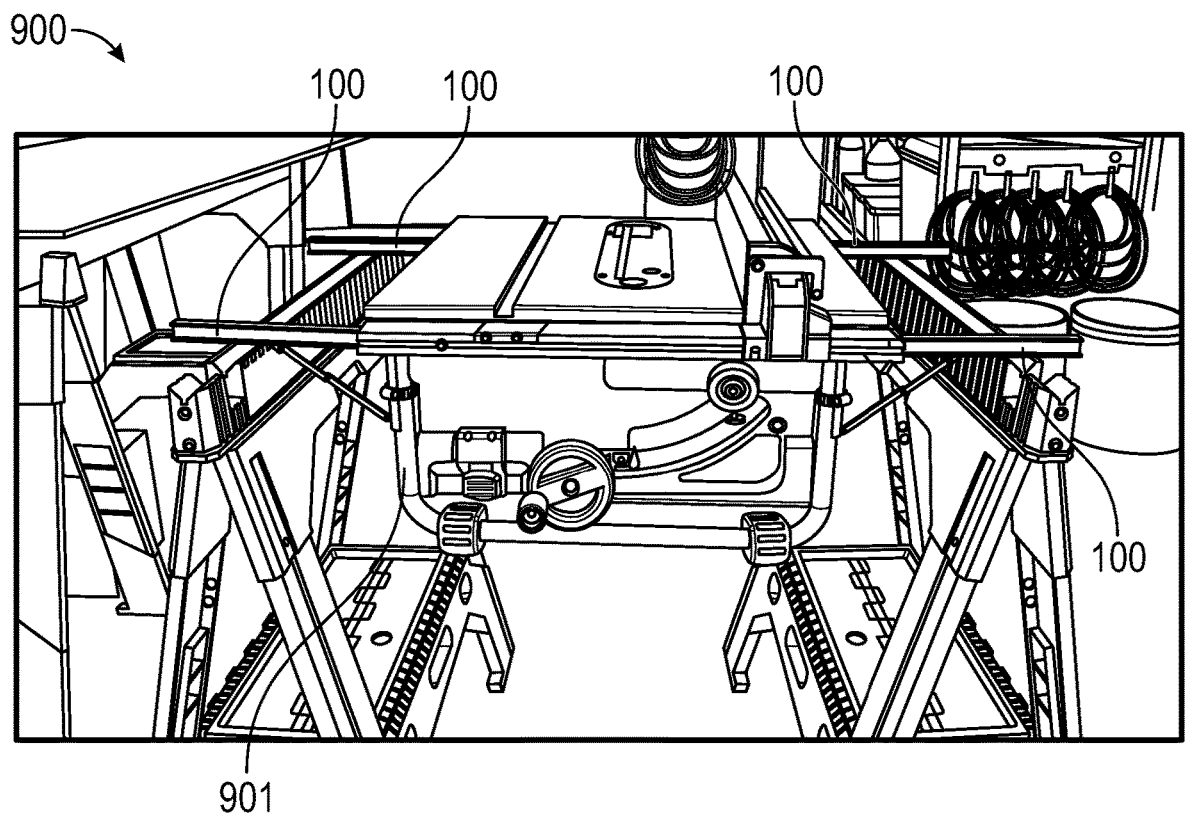
FIG. 9 is a side view of four of the saw support assemblies of FIG. 1 secured to a table saw and supporting the table saw.

FIG. 1 is a perspective view of a saw support assembly according to aspects of the present disclosure. FIG. 2 is a side view of the saw support assembly of FIG. 1 in an unfolded configuration. FIG. 3 is a top plan view of the saw support assembly of FIG. 1 in an unfolded configuration. FIG. 4 is a top plan view of the saw support assembly of FIG. 1 in a folded configuration. FIG. 5 is a perspective view of the saw support assembly of FIG. 1 in a folded configuration. FIG. 6 is a side view of the saw support assembly of FIG. 1 in a folded configuration. FIG. 7 is a side view of an arm member of the saw support assembly of FIG. 1. FIG. 8 is a perspective view of a base member of the saw support assembly of FIG. 1. FIG. 9 is a side view of four of the saw support assemblies of FIG. 1 secured to a table saw and supporting the table saw.

Referring to FIGS. 1-9, a saw support assembly 100 includes a base member 101 defining a receiving channel 102. The receiving channel 102 of the base member 101 is configured to receive a leg 901 of a saw 900 therein (see, e.g., FIG. 9) to secure the base member 101 to the leg 901 of the saw 900. An arm member 103 is pivotably coupled to the base member 101. The arm member 103 is configured to pivot towards or away from the base member 101. The arm member 103 is configured to be folded against the base member 101, such as for storage (in a folded configuration—see, e.g., FIG. 5) or use (in an unfolded configuration—see, e.g., FIG. 1).

The arm member 103 is configured to extend from the base member 101 to support the leg 901 of the saw 900 to which the base member 101 is secured. A branch member 104 extends between the base member 101 and the arm member 103. The branch member 104 defines a first end 105 connected with the base member 101 and a second end 106 connected with the support arm 103. The branch member 104 is configured to limit a degree to which the arm member 103 can pivot away from the base member 101.

In an unfolded configuration, the arm member 103 forms about a 90 degree angle with the base member 101 and the branch member 104 forms about a 45 degree angle between branch member 104 and base member 101 and between the branch member 104 and the arm member 103 (see, e.g., FIG. 2). This allows the base member 101 to be securely coupled to the leg 901 of the saw 900 while arranged in substantially vertical alignment, the arm member 103 to extend in substantially horizontal alignment with an upper surface of the saw 900, and the branch member 104 provides vertical tension/support to prevent the arm member 103 from pivoting beyond ninety degrees with respect to the base member 101 so that the upper surface of the saw maintains level alignment with the earth.

The arm member 103 may be coupled to the base member 101 by at least one bolt or rivet 107, such as a bolt or rivet secured to support arms 108, 109 extending from the base member 101. The branch member 104 may similarly to be secured to the base member 101 by at least one bolt or rivet 101, such as a bolt or rivet secured to at least one support arm 111 extending from the base member 101. An opposite end (e.g., end 106) of the branch member 104 may similarly to be secured to the arm member 103 by at least one bolt or rivet 112, such as a bolt or rivet secured to at least one support arm 113 extending from the arm member 103.

In an aspect of the present disclosure, a notch 114 (see, e.g., FIG. 8) is defined in the base member 101 and an overhang 115 (see, e.g., FIG. 7) is defined in the arm member 103. The overhang 115 is configured to be seated in the notch 114 when the arm member 103 is maximally pivoted away from the base member 101. This provides additional structural support (e.g., in conjunction with the branch member 104) to prevent the arm member 103 from pivoting beyond ninety degrees with respect to the base member 101.

In an aspect of the present disclosure, the branch member 104 defines a first branch member 116 pivotably coupled to the base member 101 and a second branch member 117 pivotably coupled to the arm member 103. The first branch member 116 is pivotably coupled to the second branch member 117 (e.g., by a bolt or rivet 118 extending between apertures 119, 120 defined in each of the first and second branch members 116, 117 to allow the first and second branch members 116, 117 to pivot with respect to each other). The first and second branch members 116, 117 are configured to be folded towards each other as the arm member 103 is pivoted toward the base member 101. As an example, FIG. 2 illustrates the first and second branch members 116, 117 in an unfolded configuration in which the first and second branch members 116, 117 are in substantially linear alignment with each other. As an example, FIG. 5 illustrates the first and second branch members 116, 117 in a folded configuration in which the first and second branch members 116, 117 are each folded against the base member 101.

In an aspect of the present disclosure, the arm member 103 defines an I-beam shape. The I-beam shape increases the structural integrity and strength of the arm member 103 to prevent the arm member 103 from bending or warping.

In an aspect of the present disclosure, the arm member 103 defines a proximal end portion 121 pivotably coupled to the base member 101 and a distal end portion 122 opposite the proximal end portion 121. The distal end portion 122 of the arm member 103 defines a plurality of apertures 123 therein. The apertures 123 are distally positioned with respect to the branch member 104. The apertures 123 can be used to secure the arm member 103 to a structure on which a bottom surface of the arm member is supported. As an example, in FIG. 9 the bottom surface of each of four arm members 103 is supported be sawhorses on opposite sides of a table saw. A screw or bolt can be threaded through an aperture 123 of the arm member 103 to secure the arm member 103 to the underlying structure (e.g., the sawhorse in FIG. 9). This prevents lateral movement of the saw to which the saw support assembly 100 is secured.

In an aspect of the present disclosure, an insert member 124 is configured to be inserted in the receiving channel 102 (see, e.g., FIG. 3 or 4). The insert member 124 defines a substantially flat surface 125 along a surface of the insert member 124 facing away from the base member 101. The flat surface 125 of the insert member 124 allows the base member 101 of the saw support assembly 100 to be securely coupled to a saw having a square (rather than cylindrical) shaped leg.

As an example, the receiving channel 102 defines a semicircular shape. The insert member 124 defines a semicircular shape and is correspondingly sized to securely fit in the receiving channel 102.

In an aspect of the present disclosure, at least two apertures 126, 127 are defined in the base member 101. The apertures 126, 127 are configured to secure the base member 101 to the leg 901 of the saw 900. The insert member 124 similarly has corresponding apertures (not shown) aligned with the apertures 126, 127 of the base member 101.

In an aspect of the present disclosure, the arm member 103 defines a notch 128 on a bottom surface thereof (see, e.g. FIG. 2). The notch 128 is aligned with the aperture 127 defined in the base member 101 when the arm member 103 is folded against the base member 101. As an example, FIG. 6 illustrates an attachment bolt of the base member positioned in the notch 128 of the arm member 103 to allow the arm member 103 to fold against the base member 101.

Provided in accordance with aspects of the present disclosure is a saw support assembly kit (see, e.g., FIG. 9) including a set of at least four saw support assemblies 100. As an example, FIG. 9 illustrates four saw support assemblies 100 secured to a table saw and supporting the table saw at a desired height. While the saw support assemblies 100 described herein can be employed to support a table saw, any other saw having legs to which the base member 101 can be secured can be supported by the saw support assemblies 100 described herein.

The base member 101, and arm member 103 and/or the branch member 104 may each be formed of a material having sufficient strength to support the weight of a saw, such as a table saw. The material may be, for example, plastic, composite, resin, steel, stainless steel, graphite or carbon fiber, without limitation.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A saw support assembly, comprising:
   a base member defining an uppermost end and a lowermost end, the base member defining a receiving channel extending continuously from the uppermost end to the lowermost end of the base member, the receiving channel of the base member configured to receive a leg of a saw therein to secure the base member to the leg of the saw;
   a notch defined in the base member;
   an arm member pivotably coupled to the base member, the arm member defining an upper end, a lower end, and a vertical dimension extending between the upper and the lower end, the arm member configured to pivot towards or away from the base member, the arm member configured to extend from the base member to support the leg of the saw to which the base member is secured, wherein the arm member defines an I-beam shape, wherein an uppermost end of the upper end of the arm member is configured to be horizontally aligned with the uppermost end of the base member;
   an overhang defined in the arm member, the overhang configured to be seated in the notch when the arm member is maximally pivoted away from the base member;
   at least one aperture defined in the arm member, wherein the at least one aperture extends along the vertical dimension entirely through the arm member between the upper end and the lower end of the arm member; and
   a branch member extending between the base member and the arm member, the branch member defining a first end connected with the base member and a second end connected with the arm member, the branch member configured to limit a degree to which the arm member can pivot away from the base member.

2. The saw support assembly of claim 1, wherein the branch member defines a first branch member pivotably coupled to the base member and a second branch member pivotably coupled to the arm member, the first branch member pivotably coupled to the second branch member, wherein the first and second branch members are configured to be folded towards each other as the arm member is pivoted toward the base member.

3. The saw support assembly of claim 1, wherein the arm member defines a proximal end portion pivotably coupled to the base member and a distal end portion opposite the proximal end portion, wherein the at least one aperture includes a plurality of apertures arranged at the distal end portion of the arm member.

4. The saw support assembly of claim 1, wherein the arm member is configured to be folded against the base member.

5. The saw support assembly of claim 4, wherein the arm member is substantially parallel with the base member when the arm member is folded against the base member, and wherein the arm member forms about a ninety-degree angle with the base member when the arm member is maximally pivoted away from the base member.

6. The saw support assembly of claim 1, further including an insert member configured to be inserted in the receiving channel, the insert member configured to define a substantially flat surface along a surface of the insert member facing away from the base member.

7. The saw support assembly of claim 6, wherein the receiving channel defines a semicircular shape, and wherein the insert member defines a semicircular shape.

8. The saw support assembly of claim 1, further including at least two apertures defined in the base member, the at least two apertures configured to secure the base member to the leg of the saw.

9. The saw support assembly of claim 8, wherein the arm member defines a notch on a bottom surface thereof, the notch configured to be aligned with an aperture of the at least two apertures defined in the base member when the arm member is folded against the base member.

10. A saw support assembly kit, comprising:
    a set of at least four saw support assemblies, each of the at least four saw support assemblies including:
    a base member defining an uppermost end and a lowermost end, the base member defining a receiving channel extending continuously from the uppermost end to the lowermost end of the base member, the receiving channel of the base member configured to receive a leg of a saw therein to secure the base member to the leg of the saw;
    a notch defined in the base member;
    an arm member pivotably coupled to the base member, the arm member defining an upper end, a lower end, and a vertical dimension extending between the upper and the lower end, the arm member configured to pivot towards or away from the base member, the arm member configured to extend from the base member to support the leg of the saw to which the base member is secured, wherein the arm member defines an I-beam shape, wherein an uppermost end of the upper end of the arm member is configured to be horizontally aligned with the uppermost end of the base member;

an overhang defined in the arm member, the overhang configured to be seated in the notch when the arm member is maximally pivoted away from the base member;

at least one aperture defined in the arm member, wherein the at least one aperture extends along the vertical dimension entirely through the arm member between the upper end and the lower end of the arm member; and a branch member extending between the base member and the arm member, the branch member defining a first end connected with the base member and a second end connected with the arm member, the branch member configured to limit a degree to which the arm member can pivot away from the base member.

11. The saw support assembly kit of claim 10, wherein the branch member defines a first branch member pivotably coupled to the base member and a second branch member pivotably coupled to the arm member, the first branch member pivotably coupled to the second branch member, wherein the first and second branch members are configured to be folded towards each other as the arm member is pivoted toward the base member.

12. The saw support assembly kit of claim 10, wherein the arm member defines a proximal end portion pivotably coupled to the base member and a distal end portion opposite the proximal end portion, wherein the at least one aperture includes a plurality of apertures arranged at the distal end portion of the arm member.

13. The saw support assembly kit of claim 10, wherein the arm member is configured to be folded against the base member.

14. The saw support assembly kit of claim 13, wherein the arm member is substantially parallel with the base member when the arm member is folded against the base member, and wherein the arm member forms about a ninety degree angle with the base member when the arm member is maximally pivoted away from the base member.

15. The saw support assembly kit of claim 10, wherein each of the at least four saw support assemblies further includes an insert member configured to be inserted in the receiving channel, the insert member configured to define a substantially flat surface along a surface of the insert member facing away from the base member.

16. The saw support assembly kit of claim 15, wherein the receiving channel defines a semicircular shape, and wherein the insert member defines a semicircular shape.

17. A saw support assembly, comprising:
a base member defining an uppermost end and a lowermost end, the base member defining a receiving channel extending continuously from the uppermost end to the lowermost end of the base member, the receiving channel of the base member configured to receive a leg of a saw therein to secure the base member to the leg of the saw;

a notch defined in the base member;

an arm member pivotably coupled to the base member, the arm member defining an upper end, a lower end, and a vertical dimension extending between the upper and the lower end, the arm member configured to pivot towards or away from the base member, the arm member configured to extend from the base member to support the leg of the saw to which the base member is secured, wherein the arm member defines an I-beam shape, wherein an uppermost end of the upper end of the arm member is configured to be horizontally aligned with the uppermost end of the base member, an overhang defined in the arm member, the overhang configured to be seated in the notch when the arm member is maximally pivoted away from the base member;

at least one aperture defined in the arm member, wherein the at least one aperture extends along the vertical dimension entirely through the arm member between the upper end and the lower end of the arm member; and a branch member extending between the base member and the arm member, the branch member defining a first end connected with the base member and a second end connected with the arm member, the branch member configured to limit a degree to which the arm member can pivot away from the base member, wherein the branch member defines a first branch member pivotably coupled to the base member and a second branch member pivotably coupled to the arm member, the first branch member pivotably coupled to the second branch member, wherein the first and second branch members are configured to be folded towards each other as the arm member is pivoted toward the base member.

18. The saw support assembly of claim 17, wherein the arm member defines a proximal end portion pivotably coupled to the base member and a distal end portion opposite the proximal end portion, wherein the at least one aperture includes a plurality of apertures arranged at the distal end portion of the arm member, wherein the arm member is configured to be folded against the base member.

19. The saw support assembly of claim 18, wherein the arm member is substantially parallel with the base member when the arm member is folded against the base member, and wherein the arm member forms about a ninety degree angle with the base member when the arm member is maximally pivoted away from the base member.

20. The saw support assembly of claim 17, further including an insert member configured to be inserted in the receiving channel, the insert member configured to define a substantially flat surface along a surface of the insert member facing away from the base member.

\* \* \* \* \*